United States Patent
Su et al.

(10) Patent No.: US 9,025,869 B2
(45) Date of Patent: May 5, 2015

(54) COLOR TRANSLATION METHOD AND COLOR TRANSLATION APPARATUS

(71) Applicant: Novatek Microelectronics Corp., Hsinchu (TW)

(72) Inventors: Wei-Chi Su, Tainan (TW); Chih-Chia Kuo, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 63 days.

(21) Appl. No.: 13/759,068

(22) Filed: Feb. 5, 2013

(65) Prior Publication Data

US 2014/0161350 A1    Jun. 12, 2014

(30) Foreign Application Priority Data

Dec. 11, 2012  (TW) .............................. 101146694 A

(51) Int. Cl.
*G06K 9/00* (2006.01)
*H04N 1/60* (2006.01)

(52) U.S. Cl.
CPC ............... *H04N 1/60* (2013.01); *H04N 1/6002* (2013.01)

(58) Field of Classification Search
USPC .......... 382/167, 162, 274, 299, 300; 345/589, 345/590, 591, 603, 604, 613; 348/254, 278, 348/241; 358/1.9, 518, 519, 525
See application file for complete search history.

(56) References Cited

U.S. PATENT DOCUMENTS

| | | | | |
|---|---|---|---|---|
| 5,581,376 | A * | 12/1996 | Harrington | .................... 358/518 |
| 7,348,994 | B2 * | 3/2008 | Nabeshima | ................... 345/601 |
| 8,189,010 | B2 | 5/2012 | Mebane | |
| 2006/0119870 | A1 * | 6/2006 | Ho et al. | ........................ 358/1.9 |
| 2010/0149203 | A1 * | 6/2010 | Mebane | ........................ 345/589 |

FOREIGN PATENT DOCUMENTS

TW          200625928        7/2006

OTHER PUBLICATIONS

"Office Action of Taiwan Counterpart Application", issued on Mar. 16, 2015, p. 1-p. 15, in which the listed references were cited.

* cited by examiner

*Primary Examiner* — Yon Couso
(74) *Attorney, Agent, or Firm* — Jianq Chyun IP Office

(57) ABSTRACT

A color translation method and a color translation apparatus adapted to map a data point from a first color space to a second color space are provided. At least four color axes coordinating with a plurality of first reference points and a plurality of second reference points corresponding to the first reference points are used to divide the first color space and second color space into a plurality of first sub-spaces and a plurality of second sub-spaces. A target first sub-space where the data point is located is found, and then a corresponding target second sub-space is also found. According to a positional relationship between the data point and the first reference points which define the target first sub-space, an interpolation operation is applied to the second reference points which define the target second sub-space so as to obtain a mapped point in the second color space.

19 Claims, 12 Drawing Sheets

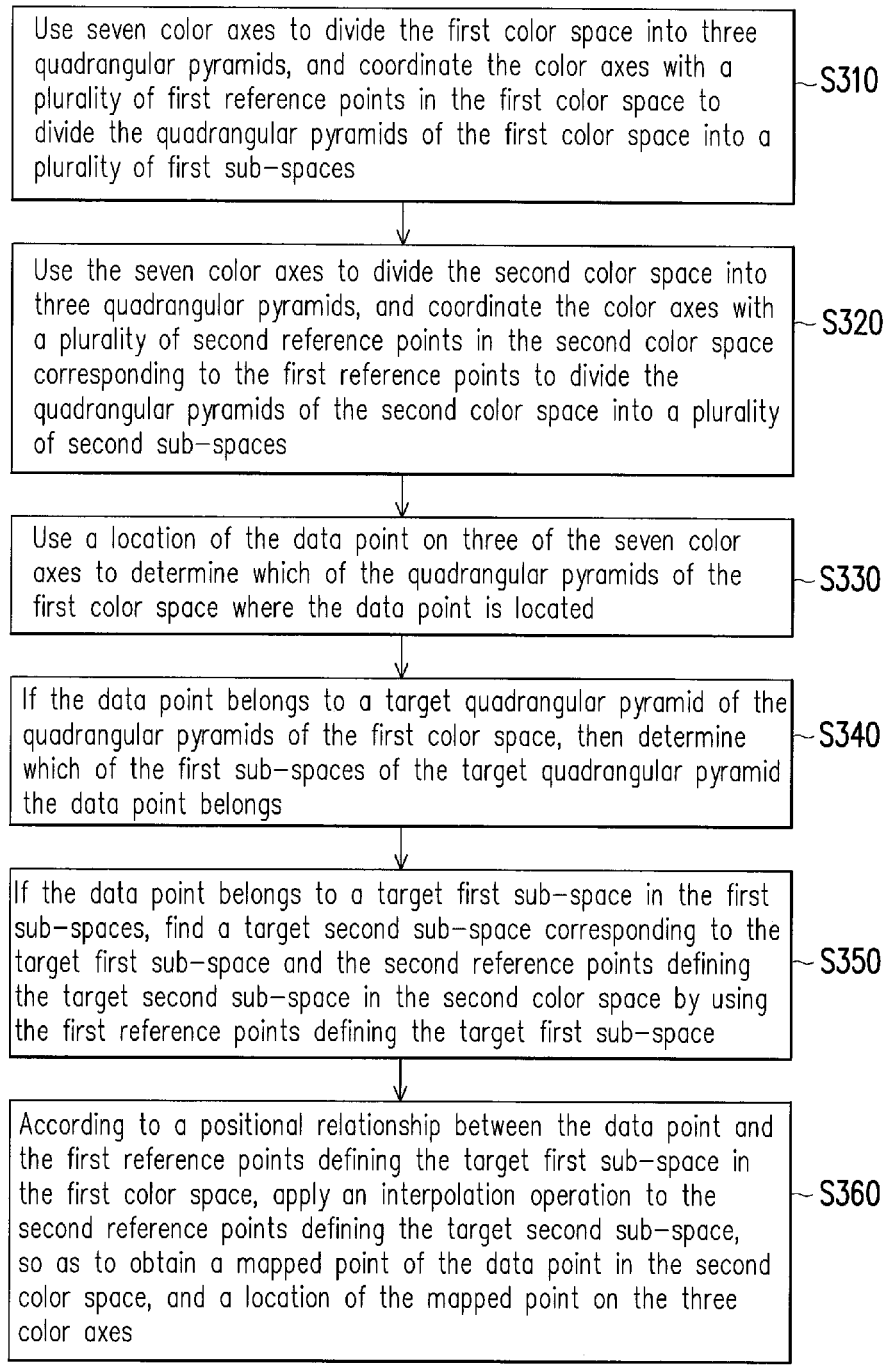
FIG. 3    300

COLOR TRANSLATION METHOD AND COLOR TRANSLATION APPARATUS

CROSS-REFERENCE TO RELATED APPLICATION

This application claims the priority benefit of Taiwan application serial no. 101146694, filed on Dec. 11, 2012. The entirety of the above-mentioned patent application is hereby incorporated by reference herein and made a part of this specification.

BACKGROUND OF THE INVENTION

1. Field of the invention

The invention relates generally to a color translation method and a color translation apparatus, and more particularly to a color translation method and a color translation apparatus capable of mitigating the color shift phenomenon.

2. Description of Related Art

Color has the capability to represent information because it is recognizable to human vision. As technology advances, color control has become an important aspect during the process of making images and photos on different mediums. Typically speaking, in order to accurately formulate the needed colors, a color model is used to generate the required colors, such as the red-green-blue (RGB) color model or the cyan-magenta-yellow-black (CMYK) color model. For a specific color model, a mapping function or a coordinate range is given to construct a color space.

Since different mediums may have different physical properties and different equipments are used, etc., various degrees of display capabilities are exhibited, such that the suitable color space for each medium is different. Even if two color spaces are established on the same color model, differences may arise due to the varying color gamuts. Therefore, when mapping one color space to another color space (i.e. color translation), a corresponding gamut mapping operation needs to be performed.

However, if the original color space has large amounts of colors (i.e., large amounts of coordinates need to be mapped to the new color space), then the mapped points in the new color space which need to be recorded would correspondingly increase. Therefore, a common method is to only record the important mapped points and use an interpolation operation to search for the mapped points in the new color space of the coordinates of the original color space. However, if only the three primary color axes (e.g., the red, green, and blue axes in the RGB color model) are used for the interpolation operation, then relative to the coordinates of the original color space, a color shift phenomenon would likely occur on the color axes (e.g. magenta and gray axes) other than the three primary colors. Therefore, researchers in the field are investigating how to avoid the color shift phenomenon when performing gamut mapping.

SUMMARY

An aspect of the invention provides a color translation method using at least four color axes and a plurality of reference points to facilitate positioning, so that when a data point is mapped from a first color space to a second color space, a color shift phenomenon is mitigated.

Another aspect of the invention provides a color translation method using seven color axes and a plurality of reference points to facilitate positioning, so that when a data point is mapped from a first color space to a second color space, a color shift phenomenon is mitigated.

Further another aspect of the invention provides a color translation apparatus using at least four color axes and a plurality of reference points. An operating unit is used to facilitate an interpolation operation so as to find a mapped point in a second color space of a data point in a first color space.

An embodiment of the invention provides a color translation method adapted to map a data point from a first color space to a second color space. At least four color axes coordinating with a plurality of first reference points in the first color space are used to divide the first color space into a plurality of first sub-spaces. The at least four color axes coordinating with a plurality of second reference points in the second color space corresponding to the first reference points are used to divide the second color space into a plurality of second sub-spaces. A target first sub-space where the data point is located in the first sub-spaces is found. Moreover, a target second sub-space corresponding to the target first sub-space in the second sub-spaces is found. According to a positional relationship between the data point and the first reference points defining the target first sub-space in the first color space, an interpolation operation is applied to the second reference points defining the target second sub-space so as to obtain a mapped point of the data point in the second color space.

According to an embodiment of the invention, the target first sub-space is a first polyhedron, and a portion of the first reference points is located on a plurality of vertices of the first polyhedron.

According to an embodiment of the invention, the target second sub-space is a second polyhedron, and a portion of the second reference points is located on a plurality of vertices of the second polyhedron.

According to an embodiment of the invention, each of the first sub-spaces is defined by a portion of the first reference points, and each of the second sub-spaces is defined by a portion of the second reference points.

According to an embodiment of the invention, applying the interpolation operation to the second reference points defining the target second sub-space includes the following steps. The second reference points defining the target second sub-space are used to perform the interpolation operation so as to obtain a plurality of first interpolated locations, in which the first interpolated locations are located on the edges of the target second sub-space. The first interpolated locations are used to perform the interpolation operation so as to obtain a plurality of second interpolated locations. The second interpolated locations are used to perform the interpolation operation so as to obtain a location of the mapped point.

According to an embodiment of the invention, the color axes at least include four of red (R), green (G), blue (B), yellow (Y), cyan (C), magenta (M), and gray (W) axes.

According to an embodiment of the invention, the first color space and the second color space are constructed on a red-green-blue (RGB) color model or a cyan-magenta-yellow (CMY) color model.

According to an embodiment of the invention, a quantity of the at least four color axes is seven.

According to an embodiment of the invention, the color axes include a red axis, a green axis, a blue axis, a yellow axis, a cyan axis, a magenta axis, and a gray axis.

According to an embodiment of the invention, the red axis, the green axis, the blue axis, the yellow axis, the cyan axis, the magenta axis, and the gray axis are used to divide the first color space into three quadrangular pyramids, and the quadrangular pyramids of the first color space are divided into the first sub-spaces according to the first reference points. Moreover, the red axis, the green axis, the blue axis, the yellow axis, the cyan axis, the magenta axis, and the gray axis are used to divide the second color space into three quadrangular pyramids, and the quadrangular pyramids of the second color space are divided into the second sub-spaces according to the second reference points corresponding to the first reference points.

According to an embodiment of the invention, a quantity of the at least four color axes is four.

According to an embodiment of the invention, the color axes include a red axis, a green axis, a blue axis, and a gray axis.

According to an embodiment of the invention, the red axis, the green axis, the blue axis, and the gray axis are used to divide the first color space into three quadrangular pyramids, and the quadrangular pyramids of the first color space are divided into the first sub-spaces according to the first reference points. Moreover, the red axis, the green axis, the blue axis, and the gray axis are used to divide the second color space into three quadrangular pyramids, and the quadrangular pyramids of the second color space are divided into the second sub-spaces according to the second reference points corresponding to the first reference points.

An embodiment of the invention provides a color translation method adapted to map a data point from a first color space to a second color space. Seven color axes are used to divide the first color space into three quadrangular pyramids, and the seven color axes are coordinated with a plurality of first reference points in the first color space to divide the quadrangular pyramids of the first color space into a plurality of first sub-spaces. Seven color axes are used to divide the second color space into three quadrangular pyramids, and the seven color axes are coordinated with a plurality of second reference points in the second color space corresponding to the first reference points to divide the quadrangular pyramids of the second color space into a plurality of second sub-spaces. A location of the data point on three of the seven color axes is used, and which of the quadrangular pyramids of the first color space the data point is located is determined. If the data point belongs to a target quadrangular pyramid of the plurality of quadrangular pyramids of the first color space, which of the first sub-spaces of the target quadrangular pyramid the data point belongs to is determined. If the data point belongs to a target first sub-space in the first sub-spaces, a target second sub-space corresponding to the target first sub-space and the second reference points defining the target second sub-space are found using the first reference points defining the target first sub-space. According to a positional relationship between the data point and the first reference points defining the target first sub-space in the first color space, an interpolation operation is applied to the second reference points defining the target second sub-space, so as to obtain a mapped point of the data point in the second color space, and a location of the mapped point on three of the seven color axes.

An embodiment of the invention provides a color translation apparatus adapted to map a data point from a first color space to a second color space. The color translation apparatus includes a memory and an operating unit. The memory stores a plurality of first reference points in the first color space. The operating unit is coupled to the memory. Moreover, the operating unit uses at least four color axes coordinating with a plurality of first reference points in the first color space to divide the first color space into a plurality of first sub-spaces. The operating unit uses the at least four color axes coordinating with a plurality of second reference points in the second color space corresponding to the first reference points to divide the second color space into a plurality of second sub-spaces. The operating unit finds a target first sub-space where the data point is located in the first sub-spaces. Moreover, the operating circuit unit finds a target second sub-space in the second color space corresponding to the target first sub-space. According to a positional relationship between the data point and the first reference points defining the target first sub-space in the first color space, the operating unit applies an interpolation operation to the second reference points defining the target second sub-space so as to obtain a mapped point of the data point in the second color space.

In summary, according to the color translation methods in the embodiments of the invention, at least four color axes coordinating with the first reference points in the first color space and the second reference points in the second color space can be used to respectively divide the first color space and the second color space into a plurality of first sub-spaces and second sub-spaces. The target first sub-space where the data point is located is determined, the corresponding target second sub-space is found, and the interpolation operation is applied to obtain the location of the mapped point. Since at least four color axes are used to define the sub-spaces, when the data point is mapped, the corresponding first sub-space and second sub-space can be used to position the location of the mapped point, and thereby prevent the generation of the color shift phenomenon. Moreover, the color translation apparatus provided by embodiments of the invention can adopt the afore-described color translation methods, and thereby map the data point in the first color space to the second color space without generation of the color shift phenomenon.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a flow diagram illustrating a color translation method according to another embodiment of the invention.

DESCRIPTION OF THE EMBODIMENTS

The terms "connected," "coupled," and "mounted" and variations thereof herein (including the claims) are used broadly and encompass direct and indirect connections, couplings, and mountings. For example, if the disclosure describes a first apparatus being coupled to a second apparatus, then the first apparatus can be directly connected to the second apparatus, or the first apparatus can be indirectly connected to the second apparatus through other devices or by a certain coupling means.

Figure 1:
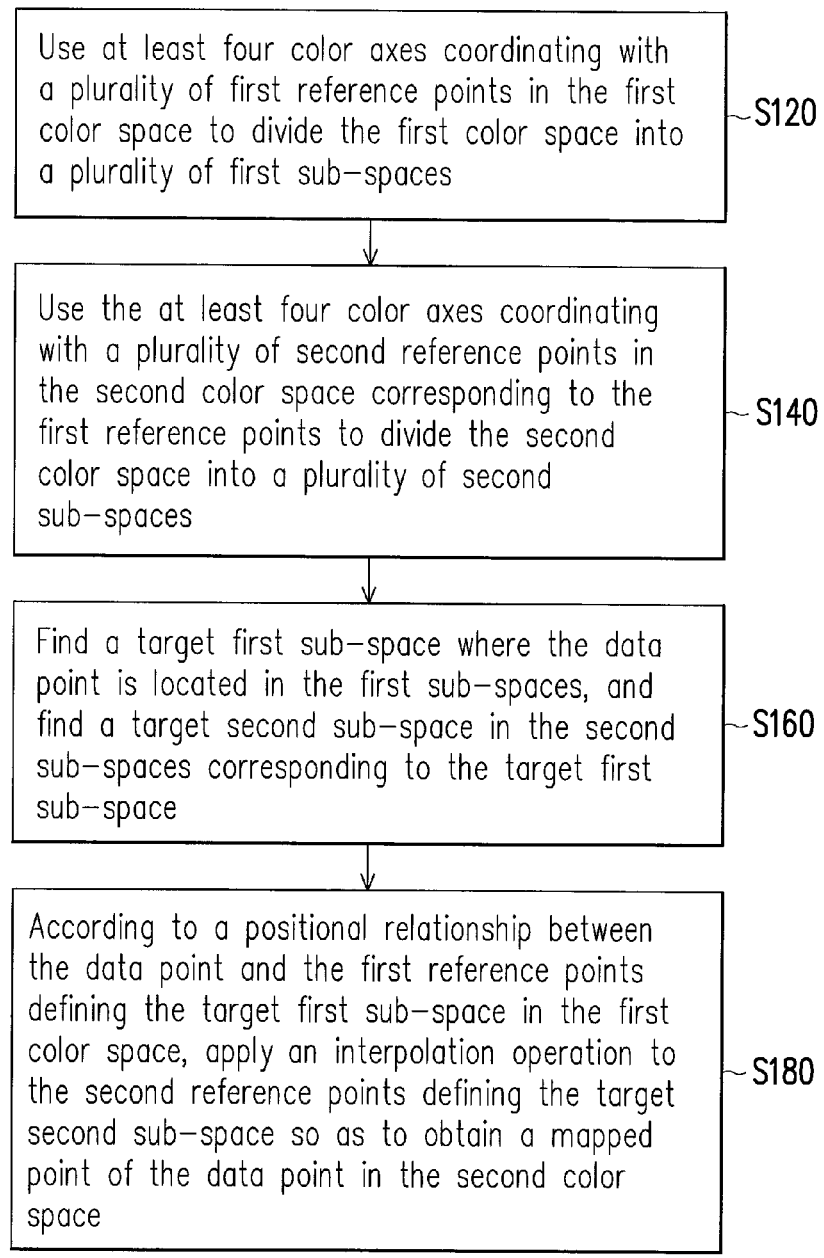
FIG. 1 is a flow diagram illustrating a color translation method according to an embodiment of the invention.
Figure 2A:
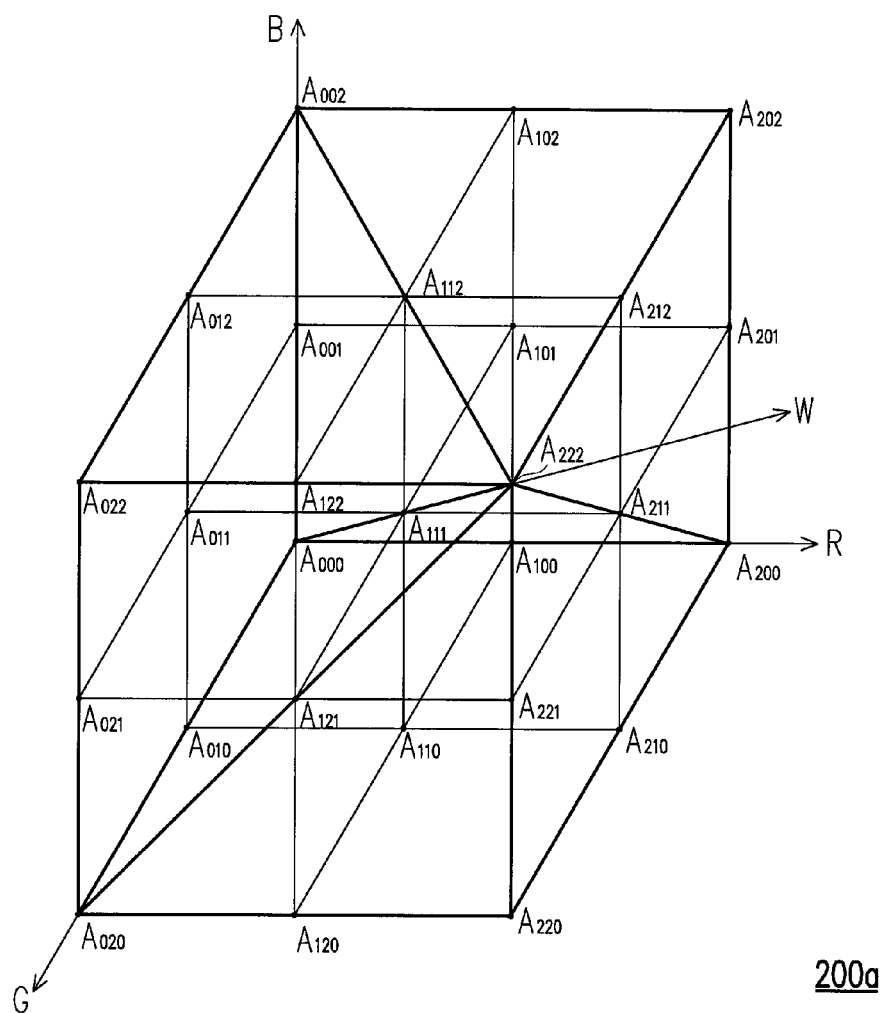
FIG. 2A is a schematic view illustrating a divided first color space according to an embodiment of the invention.

The color translation methods described by embodiments of the invention are adapted to map a data point from a first, color space to a second color space. FIG. 1 is a flow diagram illustrating a color translation method according to an embodiment of the invention. With reference to FIG. 1, in Step S120, at least four color axes coordinating with a plurality of first reference points in the first color space are used to divide the first color space into a plurality of first sub-spaces. FIG. 2A is a schematic view illustrating a divided first color space according to an embodiment of the invention. With reference to FIG. 2A, a first color space 200a adopts (but is not limited to) a red-green-blue (RGB) color model, and uses a red axis (R), green axis (G), and blue axis (B) framework to construct a coordinate system used by the first color space 200a. In details, in the first color space 200a of the present embodiment, the coordinate values on the red axis (R), the green axis (G), and the blue axis (B) can be represented by bit encoding. Using an 8-bit RGB model as an example, the range of the red axis (R), the green axis (G), and the blue axis (B) are all 0-255, and the reference points $A_{200}$, $A_{020}$, and $A_{002}$ in the first color space 200a respectively represent the maximum range of the red axis (R), the green axis (G), and the blue axis (B).

In the present embodiment, four color axes, such as the red axis (R), the green axis (G), the blue axis (B), and the gray axis (W), respectively, coordinating with a plurality of first reference points A, for example 27 first reference points (shown in FIG. 2A) $A_{000}$, $A_{200}$, $A_{020}$, $A_{002}$, and $A_{222}$ are used to divide the first color space 200a. A method of selecting the first reference points A is provided. The method respectively varies and combines a maximum, a minimum, and a median value of the red axis (R), the green axis (G), and the blue axis (B), and a portion of the first reference points A is located on the gray axis (W). It should be noted that, the method of selecting the first reference points A are not limited thereto.

Figure 2B:
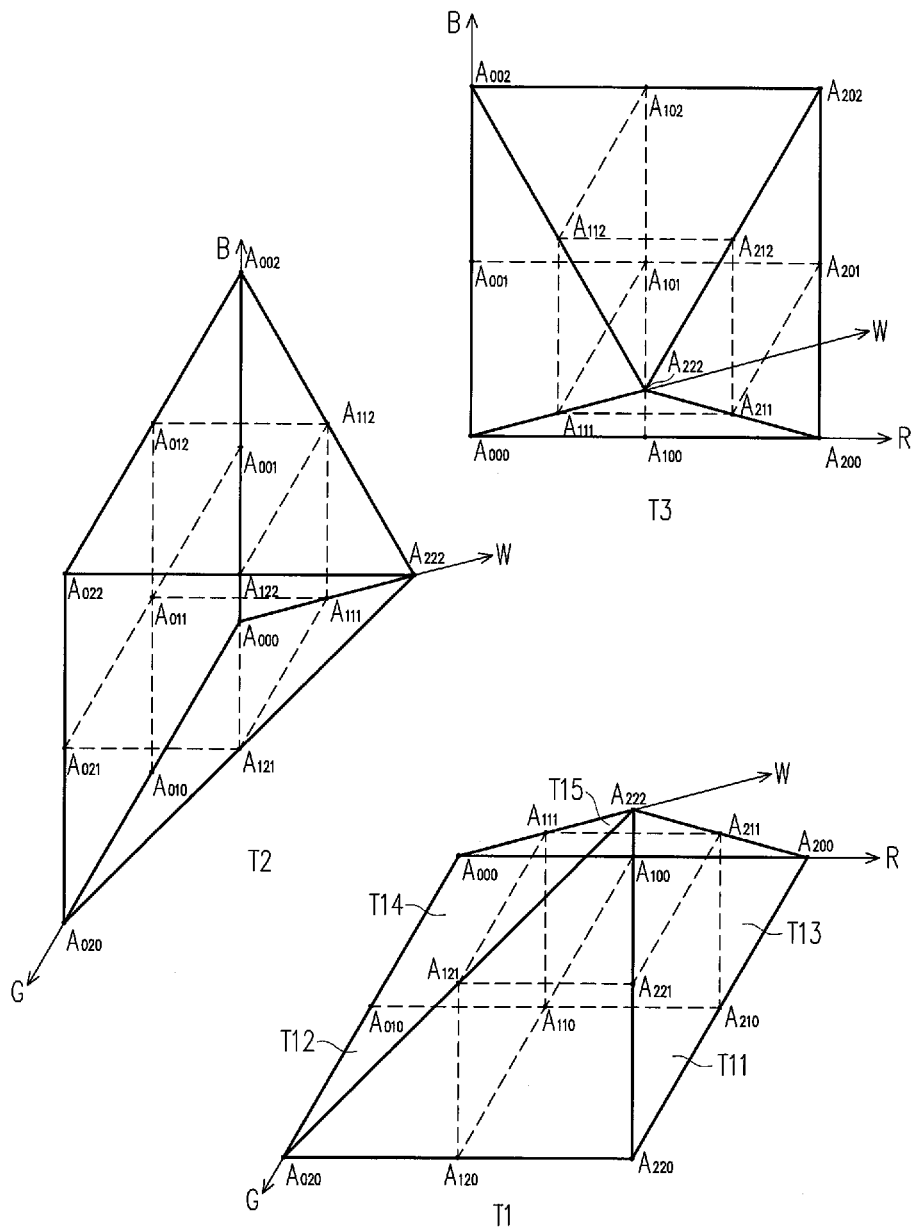
FIG. 2B is a schematic view illustrating quadrangular pyramids generated by dividing a first color space 200a according to an embodiment of the invention.

By using the four color axes, the first color space 200a can be divided into three quadrangular pyramids. FIG. 2B is a schematic view illustrating quadrangular pyramids generated by dividing a first color space 200a according to an embodiment of the invention. As shown in FIG. 2B, the three quadrangular pyramids may be respectively defined by different first reference points A. Taking a quadrangular pyramid T1 as an example, the vertices are the first reference points $A_{000}$, $A_{200}$, $A_{020}$, $A_{220}$, and $A_{222}$, respectively. The vertices of a quadrangular pyramid T2 are the first reference points $A_{000}$, $A_{002}$, $A_{020}$, $A_{022}$, and $A_{222}$, respectively. The vertices of a quadrangular pyramid T3 are the first reference points $A_{000}$, $A_{200}$, $A_{002}$, $A_{202}$, and $A_{222}$, respectively. Moreover, besides using the red axis (R), the green axis (G), the blue axis (B), and the gray axis (W) coordinating with the first reference points A, the first color space 200a can be further divided into a plurality of first sub-spaces. With reference to FIG. 2B and taking the quadrangular pyramid T1 as an example, by using the reference points $A_{000}$, $A_{100}$, $A_{010}$, $A_{110}$, $A_{200}$, $A_{020}$, $A_{220}$, $A_{120}$, $A_{210}$, $A_{221}$, $A_{211}$, $A_{121}$, $A_{111}$ and $A_{222}$ and coordinating with the red axis (R), the green axis (G), and the gray axis (W), the quadrangular pyramid T1 is further divided into a plurality of first sub-spaces T11-T15. The first sub-spaces T11-T15 are all polygonal bodies, and the vertices of each of the first sub-spaces T11-T15 are the first reference points A. However, the shapes of the first sub-spaces T11-T15 are not all the same. For example, the first sub-space T11 is a cube with vertices of $A_{220}$, $A_{120}$, $A_{210}$, $A_{221}$, $A_{211}$, $A_{121}$, $A_{111}$, and $A_{110}$. Accordingly, a portion of the first reference points A is on the vertices of the first sub-space T11. The methods of dividing the quadrangular pyramids T2 and T3 into the first sub-spaces can be derived from the afore-described method, and therefore further elaboration thereof is omitted. It should be noted that, each of the first sub-spaces is defined by a portion of the first reference points A.

Figure 2C:
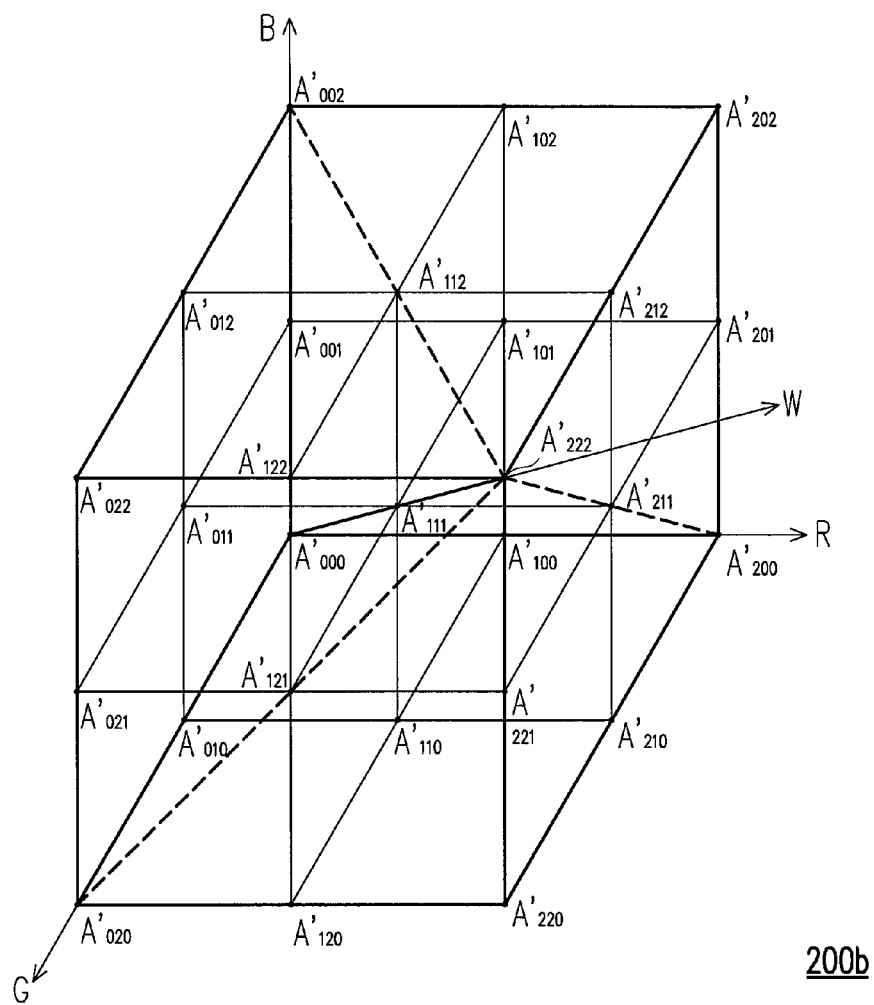
FIG. 2C is a schematic view illustrating a divided second color space according to an embodiment of the invention.

Referring again to FIG. 1, in Step S140, similarly, the at least four color axes coordinating with a plurality of second reference points in the second color space corresponding to the first reference points are used to divide the second color space into a plurality of second sub-spaces. FIG. 2C is a schematic view illustrating a divided second color space according to an embodiment of the invention. With reference to FIG. 2C, a second color space 200b also adopts the RGB color model and uses the same coordinate system as the first color space 200a. However, the second color space 200b differs from the first color space 200a (FIG. 2A) in the definition of the color gamuts. For example, the red axis (R) of the second color space 200b may have only 7 bits, and so the range of the red axis (R) is 0-127. Therefore, a reference point $A'_{200}$ representing the maximum range of the red axis (R) in the second color space 200b is different when compared to the reference point $A_{200}$ representing the maximum range of the red axis (R) in the first color space 200a. Moreover, in the second color space 200b, the red axis (R) may also have 8 bits, and so the effective range of the red axis (R) may be only 0-235.

In order to facilitate translation, before mapping a data point (not drawn) from the first color space 200a to the second color space 200b, the second color space 200b is divided in advance by at least four color axes (e.g., the red axis (R), the green axis (G), the blue axis (B), and the gray axis (W)). It should be noted that, for clarity of the drawing, the second color space 200b in FIG. 2C is also depicted by a cube, although the maximum ranges of the red axis (R), the green axis (G), and the blue axis (B) may not be all the same. Similar to FIG. 2A, since the color axes used to divide the second color space 200b of FIG. 2C are the same as the color axes used to divide the first color space 200a of FIG. 2A, the second color space 200b may be divided into three quadrangular pyramids as shown in FIG. 2B.

Figure 2D:
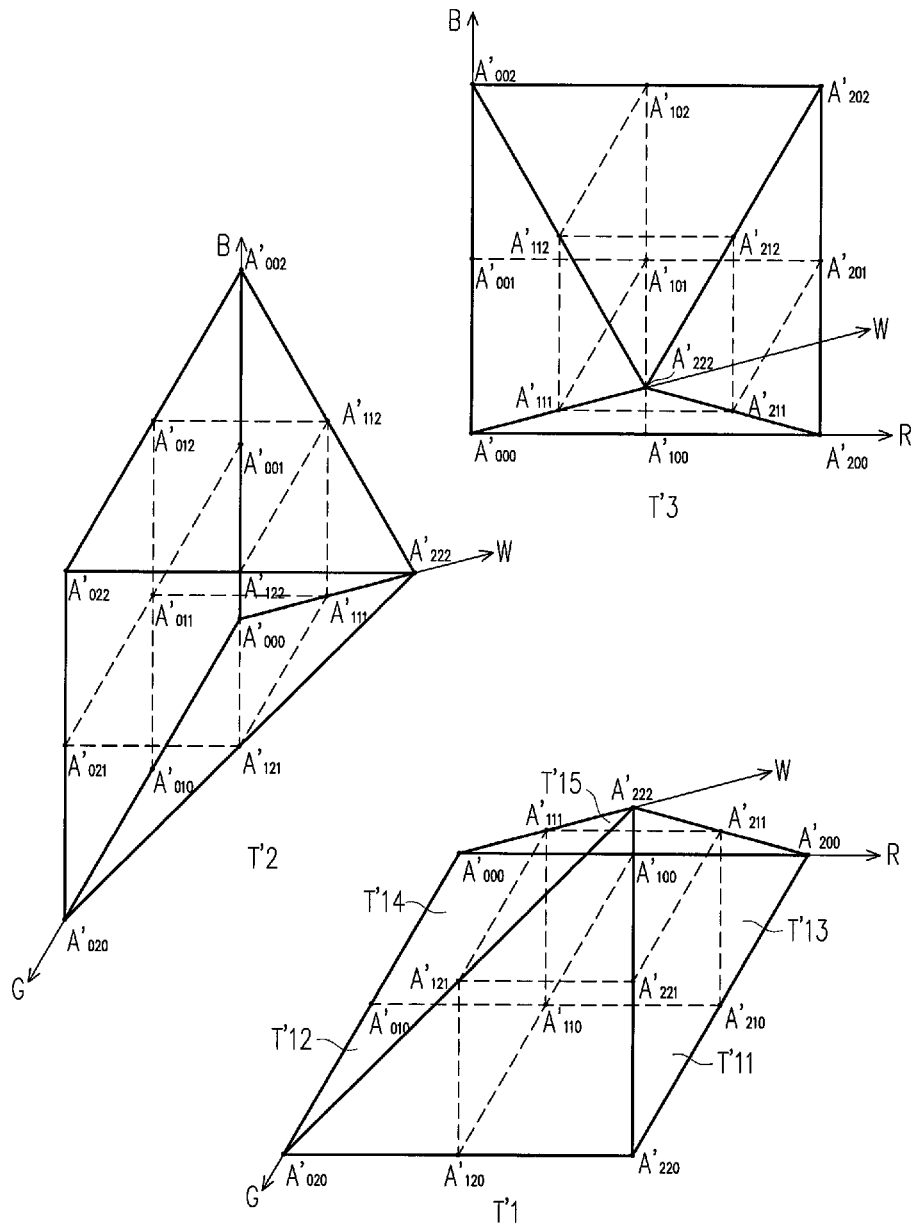
FIG. 2D is a schematic view illustrating quadrangular pyramids generated by dividing a second color space 200b according to an embodiment of the invention.

FIG. 2D is a schematic view illustrating quadrangular pyramids generated by dividing a second color space 200b according to an embodiment of the invention. As shown in FIG. 2D, the three quadrangular pyramids may be respectively defined by different second reference points A'. Taking a quadrangular pyramid T'1 as an example, the vertices are the second reference points $A'_{000}$, $A'_{200}$, $A'_{020}$, $A'_{220}$, and $A'_{222}$, respectively. The vertices of a quadrangular pyramid T'2 are the second reference points $A'_{000}$, $A'_{002}$, $A'_{020}$, $A'_{022}$, and $A'_{222}$, respectively. The vertices of a quadrangular pyramid T'3 are the second reference points $A'_{000}$, $A'_{200}$, $A'_{002}$, $A'_{202}$, and $A'_{222}$, respectively. Similarly, besides the color axes described, the second color space 200b can be divided into a plurality of second sub-spaces by using a plurality of second reference points A'. It should be noted that, the second reference points A' are selected to correspond to the first reference points A. In the present embodiment, similar to the first reference points A, the second reference points A' may be selected by varying and combining a maximum, a minimum, and a median value of the red axis (R), the green axis (G), and the blue axis (B), and a portion of the second reference points A' is located on the gray axis (W), although not limited thereto. A difference exists in that, the color gamuts in the second color space 200b may not be the same as the color gamuts in the first color space 200a. Therefore, the coordinate values of the first reference points A and the corresponding second reference points A' may not be the same. Using the previously described example, if the effective range of the red axis (R) in the second color space 200b is only 0-235, when a coordinate value of the first reference point $A_{200}$ is (255, 0, 0), then a coordinate value of the corresponding second reference point $A'_{200}$ may only be (235, 0, 0).

With reference to FIG. 2D and taking the quadrangular pyramid T'1 as an example, by using the second reference points $A'_{000}$, $A_{100}$, $A_{010}$, $A'_{110}$, $A'_{200}$, $A'_{020}$, $A'_{220}$, $A'_{120}$, $A'_{210}$, $A'_{221}$, $A'_{211}$, $A'_{121}$, $A'_{111}$ and $A'_{222}$ and coordinating with the red axis (R), the green axis (G), and the gray axis (W), the quadrangular pyramid T'1 is further divided into a plurality of second sub-spaces T'11-T'15. The second sub-spaces T'11-T'15 are all polygonal bodies, and the vertices of each of the second sub-spaces T'11-T'15 are second reference points A'. However, the shapes of the second sub-spaces T'11-T'15 are not all the same. For example, the second sub-space T'11 is a cube with vertices of $A'_{220}$, $A'_{120}$, $A'_{210}$, $A'_{221}$, $A'_{211}$, $A'_{121}$, $A'_{111}$, and $A'_{110}$. Since the same color axes and the corresponding second reference points A' are used for the division, the second sub-space T'11 is similar to the first sub-space T11. The methods of dividing the quadrangular pyramids T'2 and T'3 into the second sub-spaces can be derived from the afore-described method, and therefore further elaboration thereof is omitted. It should be noted that, each of the divided second sub-spaces is defined by a portion of the second reference points A'. Moreover, since the same color axes and the corresponding reference points are used for the division, the first and second sub-spaces correspond to each other, and this can facilitate the finding of the mapped point in the second color space of the data point in the first color space. It should be further appreciated that, in some embodiments, a portion of the first reference points and the corresponding second reference points can be set to have the same coordinate values in different color spaces, such that the constructed color axes do not change in different color spaces. Accordingly, the colors on the lines connecting the reference points do not vary even after the color translation.

Referring again to FIG. 1, in Step S160, a target first sub-space where the data point is located is found in the first sub-spaces, and a target second sub-space corresponding to the target first sub-space is found in the second sub-spaces. In Step S180, according to a positional relationship between the data point and the first reference points defining the target first sub-space in the first color space, an interpolation operation is applied to the second reference points defining the target second sub-space so as to obtain a mapped point of the data point in the second color space. An example is provided below to facilitate description.

Figure 2E:
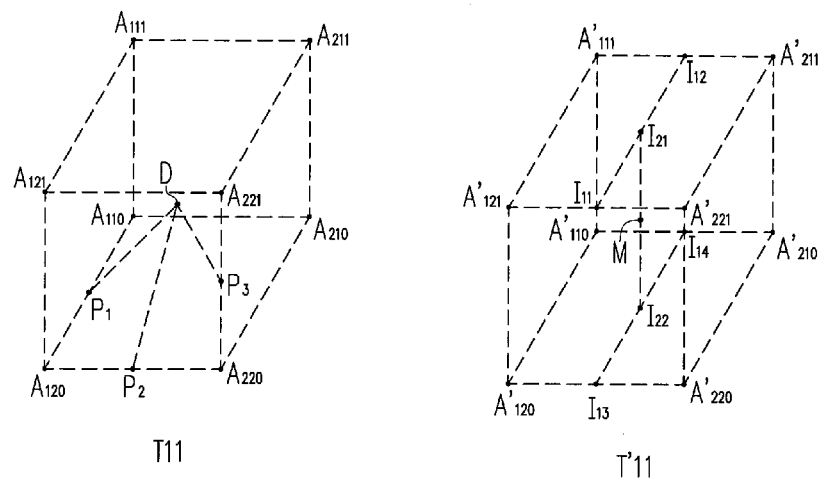
FIG. 2E is a schematic view illustrating mapped data points according to an embodiment of the invention.

FIG. 2E is a schematic view illustrating mapped data points according to an embodiment of the invention. With reference to FIGS. 2A-2E, in the present embodiment, with the help of the first reference points A, the target first sub-space (one of the first sub-spaces) where the data point D is located can be easily derived. A simple method is to calculate the distances between the coordinate value of the data point D and the first reference points A, and thereby derive the target first sub-space where the data point is located. After the target first sub-space is confirmed, as described above, since the first sub-spaces (e.g. T11-T15) of the first color space 200a correspond to the second sub-spaces (e.g. T'11-T'15) of the second color space 200b, the target second sub-space corresponding to the target first sub-space can be obtained. With reference to FIG. 2E, if the data point D is located in the target first sub-space T11, then the target second sub-space T'11 corresponding to the first sub-space T11 can be found in the second color space 200b to facilitate mapping the data point to the second color space 200b. The target first sub-space T11 and the target second sub-space T'11 are respectively a first polyhedron and a second polyhedron. Moreover, a portion of the first reference points A is located on the vertices of the first polyhedron (i.e. T11), and a portion of the second reference points A' is located on the vertices of the second polyhedron (i.e. T'11).

If the data point D is located in the target first sub-space T11, then a positional relationship between the data point D and the first reference points $A_{220}$, $A_{120}$, $A_{210}$, $A_{221}$, $A_{211}$, $A_{121}$, $A_{111}$, and $A_{110}$ defining the target first sub-space T11 is used to find a location of a mapped point M. In specifics, when using the first reference points $A_{220}$, $A_{120}$, $A_{210}$, $A_{221}$, $A_{211}$, $A_{121}$, $A_{111}$, and $A_{110}$ defining the target first sub-space T11, and when projecting the data point D on a line connecting any two neighboring first reference points, a distance relationship between the projected location of the data point D on the line and the two first reference points can be used to find the location of the mapped point M.

For example, assume the data point D happens to be located right in a center of the target first sub-space T11. Since the target first sub-space T11 is a cube, when the data point D is projected on a line connecting any two neighboring first reference points (e.g., a line connecting the first reference points $A_{110}$ and $A_{120}$, a line connecting $A_{120}$ and $A_{220}$, or a line connecting the $A_{220}$ and $A_{221}$), the distances between the projected location (e.g. $P_1$, $P_2$, and $P_3$) of the data point D and two opposing first reference points on the line are the same. Therefore, when finding the location of the mapped point M in the target second sub-space T'11, first an interpolation operation can be respectively applied to the sets of second reference points defining the target second sub-space T'11, such as $A'_{121}$ and $A'_{221}$, $A'_{111}$ and $A'_{211}$, $A'_{110}$ and $A'_{210}$, and $A'_{120}$ and $A'_{220}$, so as to obtain a plurality of first interpolated locations $I_{11}$, $I_{12}$, $I_{13}$, and $I_{14}$. Moreover, the first interpolated locations $I_{12}$, $I_{13}$, and $I_{14}$ are all located on the edges of the target second sub-space T'11. Taking the calculation of the first interpolated location $I_{13}$ as an example, since a distance between the projected location $P_2$ of the data point D and the first reference point $A_{120}$ is the same as a distance between the projected location $P_2$ and the first reference point $A_{220}$, therefore, for the second reference points $A'_{120}$ and $A'_{220}$, the interpolation weightings of the two points are the same. In other words, the interpolation weightings may both be 0.5.

The first interpolated locations are then used to perform the interpolation operation again, so as to obtain a plurality of second interpolated locations. With reference to FIG. 2E, by respectively using the first interpolated locations $I_{11}$ and $I_{12}$, and $I_{13}$ and $I_{14}$, the second interpolated locations $I_{21}$ and $I_{22}$ can be obtained. Taking the calculation of the second interpolated location $I_{22}$ as an example, since a distance between the projected location $P_1$ of the data point D and the first reference point $A_{120}$ is the same as a distance between the projected location $P_1$ and the first reference point $A_{110}$, therefore, for the first interpolated locations $I_{13}$ and $I_{14}$, the interpolation weightings of the two points are the same during the interpolation operation.

The second interpolated locations $I_{21}$ and $I_{22}$ can then be used to perform the interpolation operation so as to obtain the location of the mapped point M. Similarly, a distance between the projected location $P_3$ of the data point D and the first reference point $A_{220}$ is the same as a distance between the projected location $P_3$ and the first reference point $A_{221}$, therefore, for the second interpolated locations $I_{21}$ and $I_{22}$, the interpolation weightings of the two points are the same during the interpolation operation.

In another embodiment, when the data point D is projected on a line connecting the first reference points $A_{121}$ and $A_{221}$, if a ratio of the distances of the projected point (not drawn) location to the first reference points $A_{121}$ and $A_{221}$ is respectively 1:3, then when the interpolation operation is applied to the corresponding second reference points $A'_{121}$ and $A'_{221}$, a ratio of the interpolation weightings of the second reference points $A'_{121}$ and $A'_{221}$ is 3:1. In other words, the interpolation weighting of the second reference point $A'_{121}$ is 0.75, and the interpolation weighting of the second reference point $A'_{221}$ is 0.25. When the data point D is projected on a line connecting any two neighboring first reference points, the distance relationship between the projected location of the data point D and the two first reference points becomes the interpolation weighting which can be used for the interpolation operation. Moreover, the corresponding interpolation weighting may also be used in the interpolation operations applied to the first interpolated locations or the second interpolated locations. With reference to FIG. 2E, when the interpolation operation is applied to the first interpolated locations $I_{11}$ and $I_{12}$, the distance relationship between the projected location $P_1$ and the two first reference points $A_{110}$ and $A_{120}$ can be used as an interpolation weighting to calculate the second interpolated position $I_{21}$.

Figure 2F:
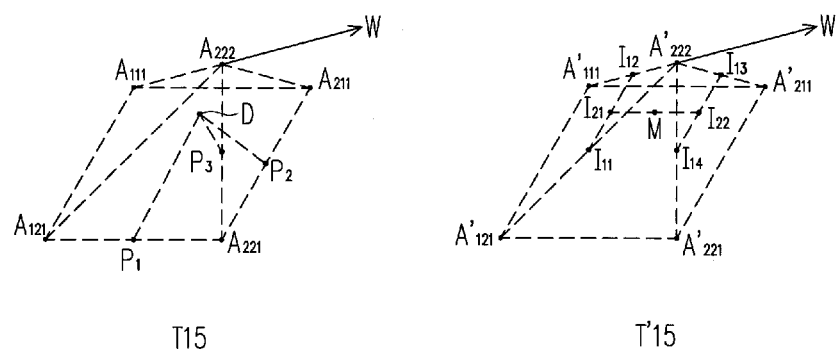
FIG. 2F is a schematic view illustrating mapped data points according to another embodiment of the invention.

The target first sub-space and the target second sub-space may not be square bodies, and may be polygonal bodies of other shapes. FIG. 2F is a schematic view illustrating mapped data points according to another embodiment of the invention. Taking a first sub-space T15 and a second sub-space T'15 of the present embodiment as an example, as described earlier, if the data point is projected on a line connecting any two neighboring first reference points (e.g., a line connecting the first reference points $A_{121}$ and $A_{221}$, a line connecting $A_{221}$ and $A_{221}$, or a line connecting the $A_{221}$ and $A_{222}$), the distances between the projected location (e.g. $P_1$, $P_2$, and $P_3$) of the data point D and two opposing first reference points are all the same, then when the interpolation operation is applied to the corresponding second reference points (e.g., the lines connecting the second reference points $A'_{121}$ and $A'_{221}$, $A'_{221}$ and $A'_{211}$, or $A'_{221}$ and $A'_{221}$), the interpolation weightings are all 0.5. When finding the location of the mapped point M in the target second sub-space T'15, first an interpolation operation can be respectively applied to the sets of second reference points defining the target second sub-space T'15, such as $A'_{222}$ and $A'_{221}$, $A'_{222}$ and $A'_{211}$, $A'_{222}$ and $A'_{121}$, and $A'_{222}$ and $A'_{111}$, so as to obtain a plurality of first interpolated locations $I_{11}$, $I_{12}$, $I_{13}$, and $I_{14}$. The first interpolated locations $I_{11}$, $I_{12}$, $I_{13}$, and $I_{14}$ are then used to perform the interpolation operation again, so as to obtain a plurality of second interpolated locations $I_{21}$ and $I_{22}$. The second interpolated locations $I_{21}$ and $I_{22}$ can then used to perform the interpolation operation so as to obtain the location of the mapped point M.

By using the afore-described color translation method to obtain the mapped point M, the color shift effect caused by color translation can be mitigated. Using the previous example, when only the first reference point $A_{200}$ (255, 0, 0) and the corresponding second reference point $A'_{200}$ (235, 0, 0) are different among the first and second reference points, then a color variation between the data point D and the mapped point M occurs only when the mapped point M is located in the second sub-space (e.g. T'13) divided by the red axis. On the other hand, when the mapped point M is located in other second sub-spaces (e.g., the second sub-spaces in the quadrangular pyramid T'2), then the color shift phenomenon is not generated for the colors of the mapped point M and the data point D due to color translation.

In the afore-described embodiments, the quantities of the color axes dividing the first color space 200a and the second color space 200b are four, and the color axes are the red axis (R), the green axis (G), the blue axis (B), and the gray axis (W), respectively. Moreover, the first color space 200a and the second color space 200b are established on the RGB color model. However, the color translation methods provided by embodiments of the invention are not limited to these conditions. In other embodiments, other quantities and colors of color axes may be selected to divide the first color space and the second color space, such as color axes of seven types of colors, including at least four color axes from the red (R), green (G), blue (B), yellow (Y), cyan (C), magenta (M), and gray (W) axes. Furthermore, the first color space and the second color space may be constructed on the CMY color model. In other words, during the color translation process, up to seven color axes may be used, respectively the red (R), green (G), blue (B), yellow (Y), cyan (C), magenta (M), and gray (W) color axes to divide the first color space and the second color space. Detailed description of a method thereof is provided hereafter.

Figure 4A:
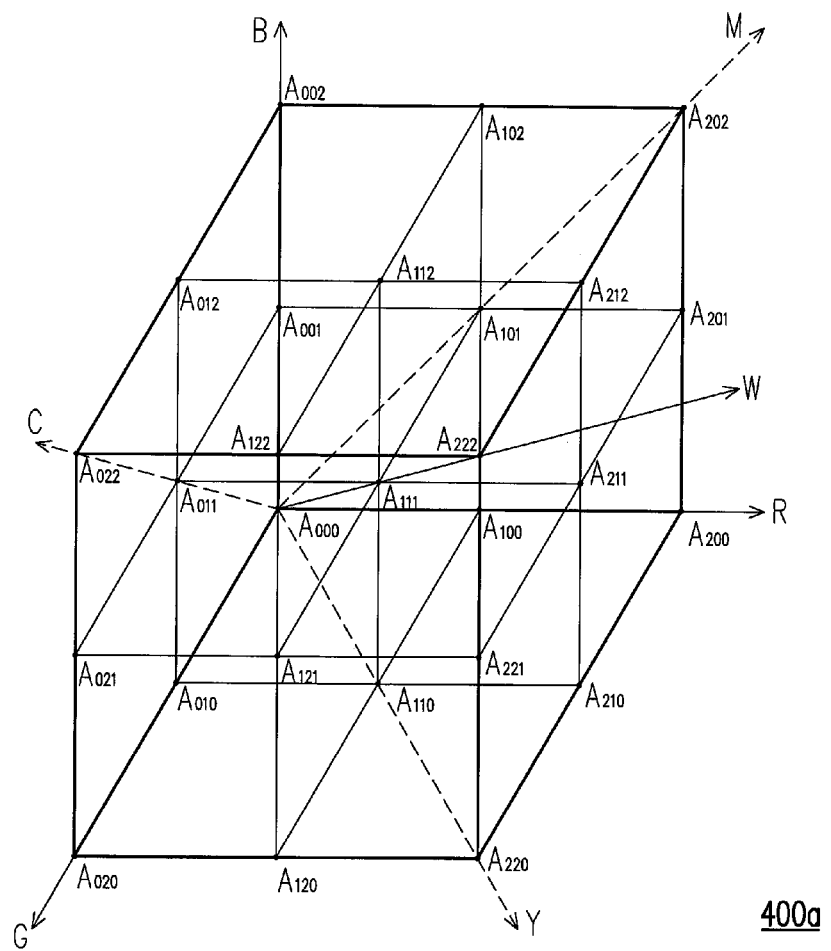
FIG. 4A is a schematic view illustrating a divided first color space according to another embodiment of the invention.
Figure 4B:
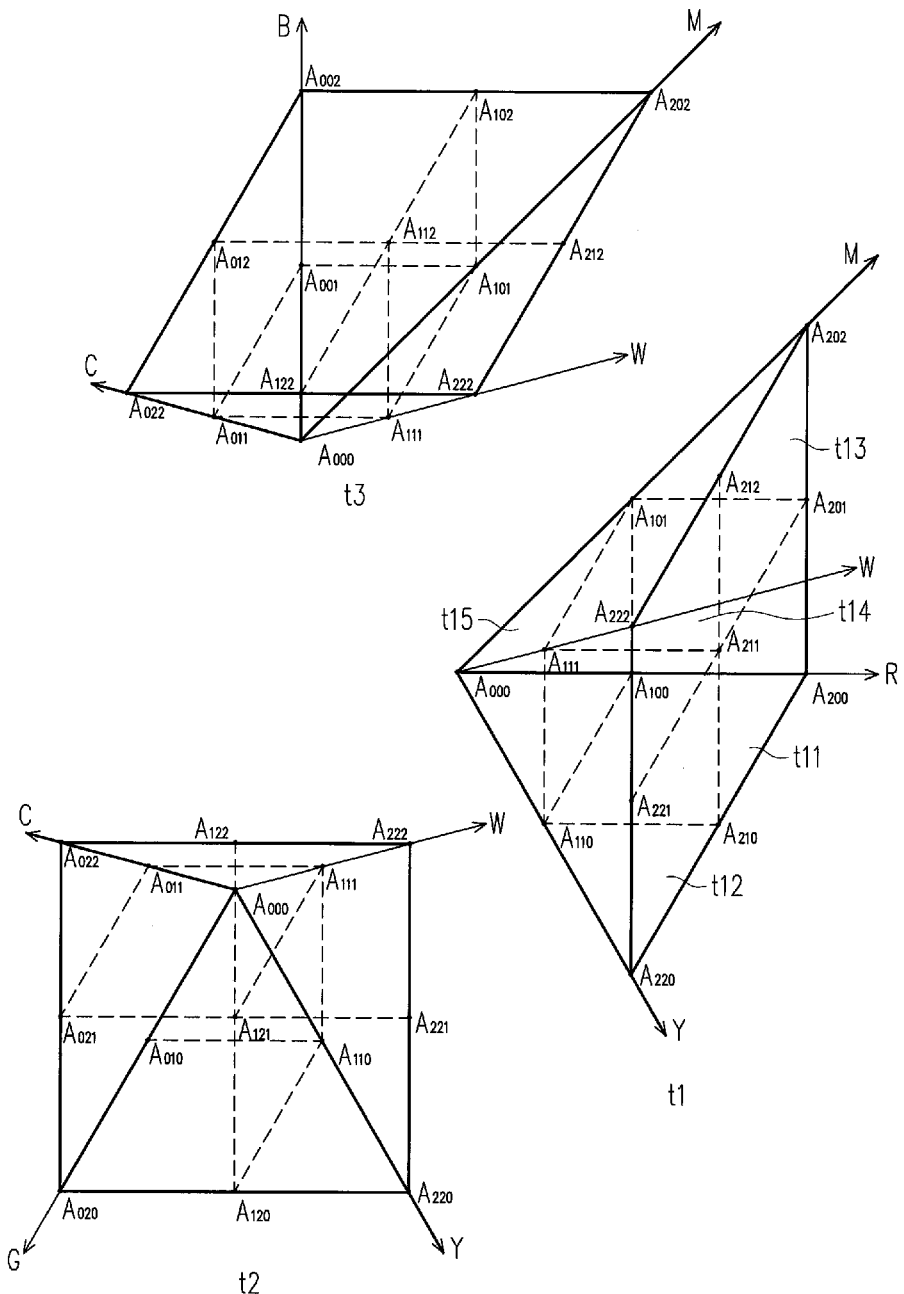
FIG. 4B is a schematic view illustrating quadrangular pyramids generated by dividing a first color space 400a according to an embodiment of the invention.

FIG. 3 is a flow diagram illustrating a color translation method according to another embodiment of the invention. As described above, the color translation method described by the present embodiment is adapted to map a data point from a first color space to a second color space. With reference to FIG. 3, in Step S310, seven color axes are used to divide the first color space into three quadrangular pyramids, and the color axes are coordinated with a plurality of first reference points in the first color space to divide the quadrangular pyramids of the first color space into a plurality of first sub-spaces. FIG. 4A is a schematic view illustrating a divided first color space according to another embodiment of the invention. With reference to FIG. 4A, the seven color axes used to divide a first color space 400a are respectively the red (R), green (G), blue (B), yellow (Y), cyan (C), magenta (M), and gray (W) axes. It should be noted that, the first color space 400a still adopts the RGB color model, and uses a red axis (R), green axis (G), and blue axis (B) framework to construct a coordinate system used by the first color space 400a. By using the seven color axes, the first color space 400a can be divided into three quadrangular pyramids. FIG. 4B is a schematic view illustrating quadrangular pyramids generated by dividing a first color space 400a according to an embodiment of the invention. As in the methods dividing the first color space 200a in the afore-described embodiments, the first color space 400a is divided by seven color axes into three quadrangular pyramids t1-t3 shown in FIG. 4B. Moreover, by coordinating with a plurality of first reference points A, the quadrangular pyramids t1-t3 are respectively divided into a plurality of first sub-spaces, such as the first sub-spaces t11-T15 in the quadrangular pyramid t1. Taking the quadrangular pyramid t1 as an example, the red axis (R), the yellow axis (Y), the magenta axis (M), the gray axis (W), and a portion of the first reference points $A_{000}$, $A_{110}$, $A_{220}$, $A_{100}$, $A_{210}$, $A_{200}$, $A_{221}$, $A_{211}$, $A_{111}$, $A_{101}$, $A_{201}$, $A_{222}$, $A_{212}$, and $A_{202}$ are used to divide t1 into the first sub-spaces t11-t15. The first sub-spaces t11-t15 are all polygonal bodies, and the vertices of each of the first sub-spaces t11-t15 are the first reference points A. However, the shapes of the first-spaces t11-t15 are not all the same. For example, the first sub-space t11 is a cube with vertices of $A_{110}$, $A_{100}$, $A_{210}$, $A_{200}$, $A_{211}$, $A_{111}$, $A_{101}$, and $A_{201}$. The methods of dividing the quadrangular pyramids t2 and t3 into the first sub-spaces can be derived from the foregoing description, and therefore further elaboration thereof is omitted. It should be noted that, each of the first sub-spaces is defined by a portion of the first reference points A.

Referring again to FIG. 3, in Step S320, the seven color axes are used to divide the second color space into three quadrangular pyramids, and the color axes are coordinated with a plurality of second reference points in the second color space corresponding to the first reference points to divide the quadrangular pyramids of the second color space into a plurality of second sub-spaces.

Figure 4C:
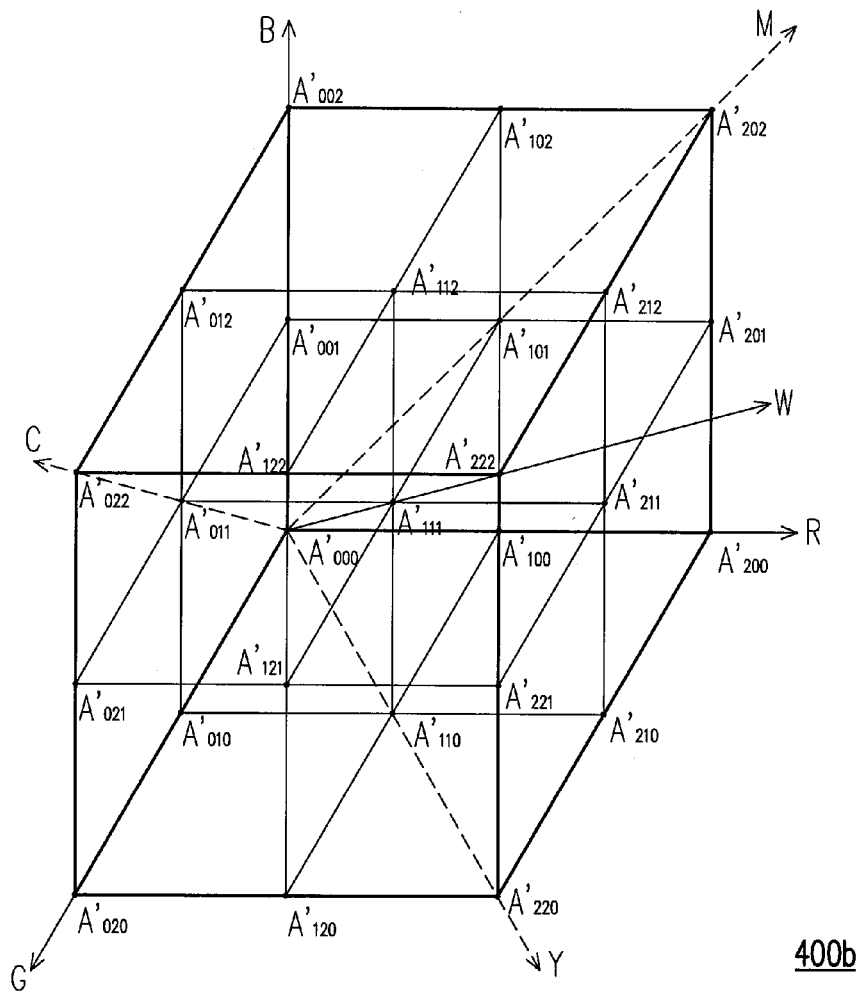
FIG. 4C is a schematic view illustrating a divided second color space according to an embodiment of the invention.

FIG. 4C is a schematic view illustrating a divided second color space according to an embodiment of the invention. With reference to FIG. 4C, a second color space 400b also adopts the RGB color model and uses the same coordinate system as the first color space 400a. However, the second color space 400b differs from the first color space 400a (FIG. 4A) in the definition of the color gamuts. Similar to FIG. 4A, the seven color axes used to divide the second color space 400a are respectively the red (R), green (G), blue (B), yellow (Y), cyan (C), magenta (M), and gray (W) axes. Moreover, the second reference points A' coordinating with the color axes to divide the second color space 400b are selected to correspond to the first reference points A. However, due to differences in color gamuts, the coordinate values of the second reference points A' in the second color space 400b in the RGB color model may be different than the first reference points A in the first color space 400a. By using the seven color axes, the second color space 400b can be similarly divided into three quadrangular pyramids.

Figure 4D:
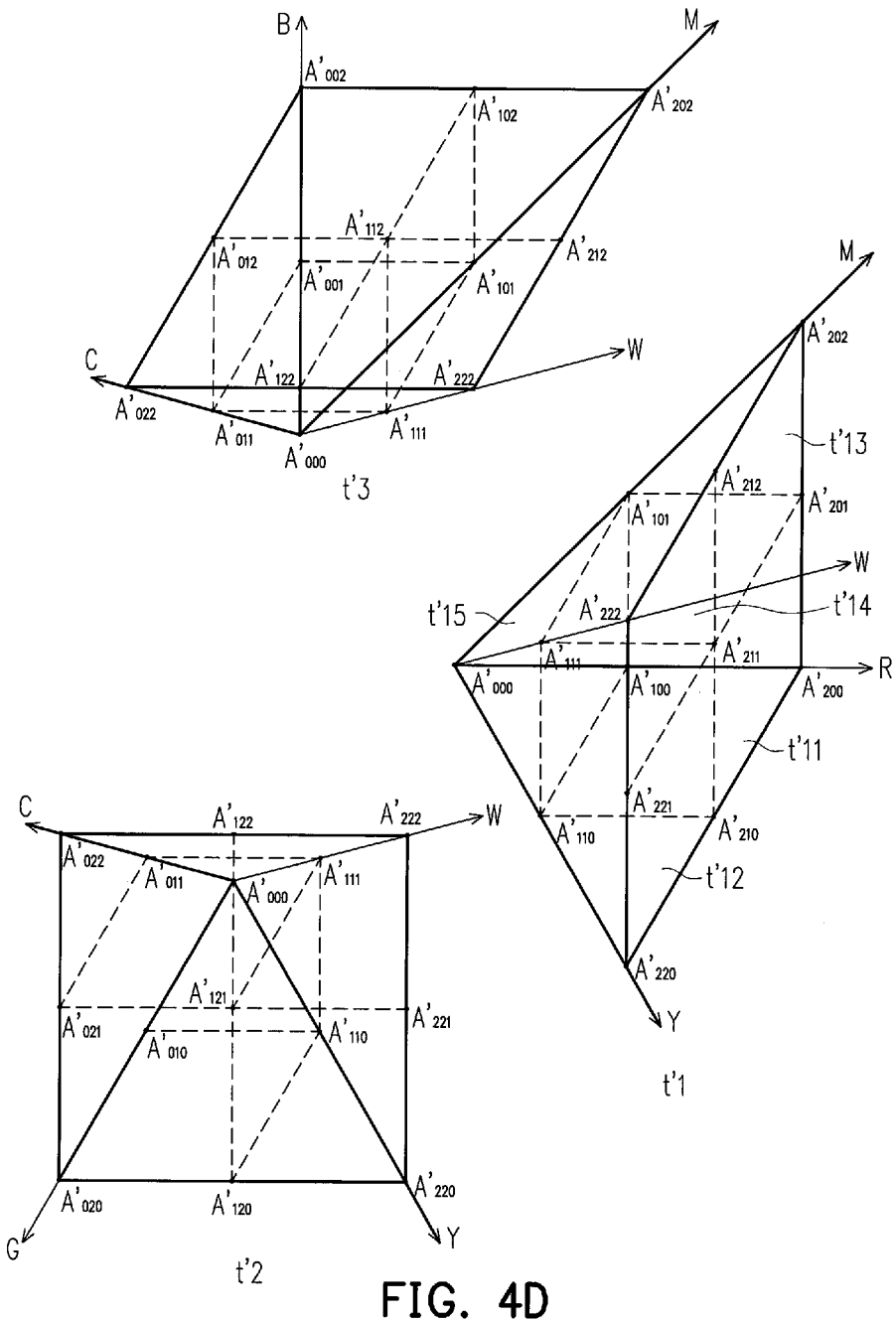
FIG. 4D is a schematic view illustrating quadrangular pyramids generated by dividing a second color space 400b according to an embodiment of the invention.

FIG. 4D is a schematic view illustrating quadrangular pyramids generated by dividing a second color space 400b according to an embodiment of the invention. As shown in FIG. 4D, the second color space 400b cut by seven color axes can be respectively divided into three quadrangular pyramids t'1-t'3, and the vertices of each of the quadrangular pyramids t'1-t'3 are the second reference points A'. By using the second reference points A', the quadrangular pyramids t'1-t'3 can be divided into a plurality of second sub-spaces, such as the second sub-spaces t'11-t'15 in the quadrangular pyramid t'1. The second sub-spaces t'11-t'15 are all polygonal bodies, and the vertices of each of the second sub-spaces t'11-t'15 are the second reference points A'. However, the shapes of the second sub-spaces t'11-t'15 are not all the same. Taking the second sub-space t'11 as an example, the second sub-space t'11 is a cube with vertices of $A'_{110}$, $A'_{100}$, $A'_{210}$, $A'_{200}$, $A'_{211}$, $A'_{111}$, $A'_{101}$, and $A'_{201}$. In specifics, each of the first sub-spaces (e.g. t11-t15) is defined by a portion of the first reference points, and each of the second sub-spaces (e.g. t'11-t'15) is defined by a portion of the second reference points A'. Since the color axes dividing the first sub-spaces (e.g. t11-t15) and the second sub-spaces (e.g. t'11-t'15) are the same, and the coordinating first reference points A correspond to the second reference points A', the first sub-spaces (e.g. t11-t15) correspond to the second sub-spaces (e.g. t'11-t'15).

With reference to FIG. 3, in Step S330, by using a location of the data point on three of the seven color axes, which of the quadrangular pyramids of the first color space where the data point is located is determined. As described earlier, the first color space 400a and the second color space 400b are both established on the RGB color model, with the red axis (R), green axis (G), and blue axis (B) constructing the coordinate system. Therefore, the data point is located in which of the quadrangular pyramids t1-t3 in the first color space 400a can be determined by using the location of the data point on the red axis (R), green axis (G), and blue axis (B). In Step S340, if the data point belongs to a target quadrangular pyramid of the quadrangular pyramids of the first color space, then which of the first sub-spaces of the target quadrangular pyramid the data point belongs is determined. In Step S350, if the data point belongs to a target first sub-space in the first sub-spaces, finding a target second sub-space corresponding to the target first sub-space and the second reference points defining the target second sub-space using the first reference points defining the target first sub-space. An example is provided below for the detailed description.

Figure 4E:
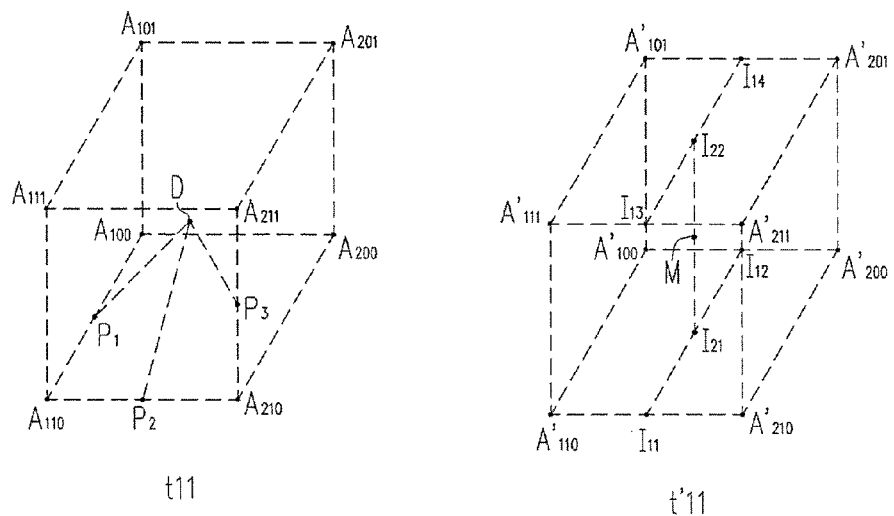
FIG. 4E is a schematic view illustrating mapped data points according to an embodiment of the invention.

FIG. 4E is a schematic view illustrating mapped data points according to an embodiment of the invention. With reference to FIGS. 4A-4E, by using the coordinate locations of the data point D and the reference points A, the target quadrangular pyramid and the target first sub-space in the first color space 400a where the data point D is located in can be easily found. A method to determine the location of the data point D is to calculate the distances between the coordinate value of the data point D and the first reference points A, and thereby derive the target quadrangular pyramid and the target first sub-space where the data point is located. As shown in FIG. 4E, the data point D is located in the first sub-space t11 in the quadrangular pyramid t1. After confirming the data point D is located in the target first sub-space t11 in the target quadrangular pyramid t1, by using the first reference points ($A_{110}$, $A_{100}$, $A_{210}$, $A_{200}$, $A_{211}$, $A_{111}$, $A_{101}$, and $A_{201}$) defining the target first sub-space t11, the corresponding target second sub-space t'11 and the second reference points ($A'_{110}$, $A'_{100}$, $A'_{210}$, $A'_{200}$, $A'_{211}$, $A'_{111}$, $A'_{101}$, and $A'_{201}$) defining the second sub-space t'11 in the second color space 400b can be found. As shown on by the afore-described embodiments, the target first sub-space t11 and the target second sub-space t'11 are respectively a first polyhedron and a second polyhedron. Moreover, a portion of the first reference points A is located on the vertices of the first polyhedron (i.e. t11), and a portion of the second reference points A' is located on the vertices of the second polyhedron (i.e. t'11).

In Step S360, according to a positional relationship between the data point and the first reference points defining the target first sub-space in the first color space, an interpolation operation is applied to the second reference points defining the target second sub-space, so as to obtain a mapped point of the data point in the second color space, and a location of the mapped point on the three color axes. With reference to FIG. 4E, the positional relationship between the data point D and the first reference points ($A_{110}$, $A_{100}$, $A_{210}$, $A_{200}$, $A_{211}$, $A_{111}$, $A_{101}$, and $A_{201}$) of the target first sub-space t11 can be used to find the location of the mapped point M in the target second sub-space t'11.

Similar to the afore-described embodiments, a distance relationship between a projected location ($P_2$, $P_3$, and $P_1$) of the data point projected on a line connecting any two neighboring first reference points (e.g., $A_{110}$ and $A_{210}$, $A_{210}$ and $A_{211}$, and $A_{110}$ and $A_{100}$) and the two first reference points on the line can be used to find the location of the mapped point M.

Therefore, when finding the location of the mapped point M in the target second sub-space t'11, first an interpolation operation can be respectively applied to the sets of second reference points defining the target second sub-space t'11, such as $A'_{110}$ and $A'_{210}$, $A'_{100}$ and $A'_{200}$, $A'_{111}$ and $A'_{211}$, and $A'_{101}$ and $A'_{201}$, so as to obtain a plurality of first interpolated locations $I_{11}$, $I_{12}$, $I_{13}$, and $I_{14}$. Moreover, the first interpolated locations $I_{11}$, $T_{12}$, $I_{13}$, and $I_{14}$ are all located on the edges of the target second sub-space t'11. The distance relationship between the projected location $P_2$ of the data point D and the first reference points $A_{110}$ and $A_{210}$ can be used as an interpolation weighting of the interpolation operation. For example, if the distances from the projected location $P_2$ of the data point D and the first reference points $A_{110}$ and $A_{210}$ are respectively the same, then when the interpolation operation is applied to the second reference points $A'_{110}$ and $A'_{210}$ to obtain the first interpolated location $I_{11}$, the interpolation weightings of the second reference points $A'_{110}$ and $A'_{210}$ are the same. In other words, the interpolation weightings are both 0.5.

The first interpolated locations $I_{11}$, $I_{12}$, $I_{13}$, and $I_{14}$ can then be used to perform the interpolation operation again, so as to obtain a plurality of second interpolated locations $I_{21}$ and $I_{22}$. Taking the calculation of the second interpolated location $I_{21}$ as an example, when the first interpolated locations $I_{11}$ and $I_{12}$ are used to perform the interpolation operation, the distance relationship between the projected location $P_1$ of the data point D and the first reference points $A_{110}$ and $A_{120}$ can be used as the interpolation weighting of the interpolation operation.

The second interpolated locations $I_{21}$ and $I_{22}$ can then be used to perform the interpolation operation so as to obtain the location of the mapped point M. Similarly, the distance relationship between the projected location $P_3$ of the data point D and the first reference points $A_{210}$ and $A_{211}$ can be used as the interpolation weighting of the interpolation operation. It should be noted that, since the second color space 400b is similarly established on the RGB color model, the obtained location of the mapped point M is the location on the red axis (R), the green axis (G), and the blue axis (B).

Figure 5:
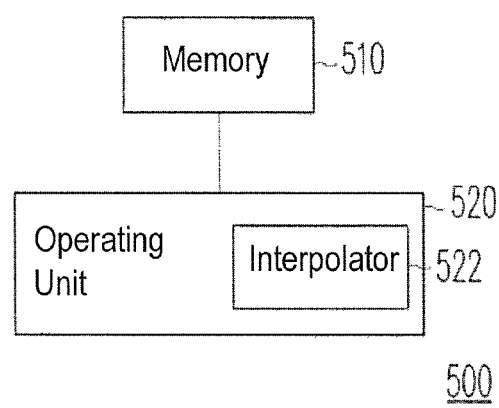
FIG. 5 is a schematic view illustrating a color translation apparatus according to an embodiment of the invention.

In one embodiment of the invention, a color translation apparatus is provided to map a data point from a first color space to a second color space. FIG. 5 is a schematic view illustrating a color translation apparatus according to an embodiment of the invention. A color translation apparatus includes a memory 510 and an operating unit 520. The memory 510 stores a plurality of first reference points in the first color space and the second reference points in the second color space. Since the first reference points in the first color space are known conditions, when a color translation is performed, the operating unit 520 is coupled to the memory 510, and the relevant first reference point information is obtained in the memory 510 to perform a subsequent calculation.

When the color translation apparatus 500 performs the color translation, the operating unit 520 uses at least four color axes coordinating with a plurality of known first reference points in the first color space to divide the first color space into a plurality of first sub-spaces. Simultaneously, the operating unit 520 also uses the at least four color axes coordinating with a plurality of second reference points in the second color space corresponding to the first reference points to divide the second color space into a plurality of second sub-spaces.

By calculation, the operating unit 520 finds a target first sub-space where the data point is located in the first sub-spaces, and finds a target second sub-space corresponding to the target first sub-space in the second sub-spaces. According to a positional relationship between the data point and the first reference points defining the target first sub-space in the first color space, an interpolation operation is then applied to the second reference points defining the target second sub-space, so as to obtain a mapped point of the data point in the second color space. In order to facilitate the interpolation operation, the operating unit 520 can further include an interpolator 522 to apply the interpolation operation to the second reference points defining the target second sub-space. Other settings of the color translation apparatus may be known by reference to the afore-described color translation methods, and therefore further elaboration thereof is omitted.

In view of the foregoing, according to embodiments of the invention, when color translation is performed, at least four color axes respectively coordinating with a plurality of first reference points and second reference points can be used to divide the first color space and the second color space, so as to obtain a plurality of corresponding first sub-spaces and second sub-spaces. By utilizing the first sub-spaces to locate the data point, and the second sub-spaces to calculate the location of the mapped point, the color shift phenomenon can be prevented when the data point is mapped from the first color space to the second space. Moreover, the degree of freedom for the color translation can be unaffected.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A color translation method adapted for a color translation apparatus to map a data point from a first color space to a second color space, the color translation apparatus comprising an operating unit and a memory coupled to the operating unit, the method comprising:

obtaining a plurality of first reference points in the first color space stored in the memory by the operating unit of the color translation apparatus and using at least four color axes coordinating with the plurality of first reference points in the first color space to divide the first color space into a plurality of first sub-spaces by the operating unit;

using the at least four color axes coordinating with a plurality of second reference points in the second color space corresponding to the first reference points to divide the second color space into a plurality of second sub-spaces by the operating unit;

finding a target first sub-space where the data point is located in the first sub-spaces, and finding a target second sub-space corresponding to the target first sub-space in the second sub-spaces by the operating unit; and according to a positional relationship between the data point and the first reference points defining the target first sub-space in the first color space, applying an interpolation operation to the second reference points defining the target second sub-space by an interpolator of the operating unit, so as to obtain a mapped point of the data point in the second color space.

2. The color translation method of claim 1, wherein the target first sub-space is a first polyhedron, and a portion of the first reference points are located on a plurality of vertices of the first polyhedron.

3. The color translation method of claim 2, wherein the target second sub-space is a second polyhedron, and a portion of the second reference points are located on a plurality of vertices of the second polyhedron.

4. The color translation method of claim 1, wherein each of the first sub-spaces is defined by a portion of the first reference points, and each of the second sub-spaces is defined by a portion of the second reference points.

5. The color translation method of claim 1, wherein the step of applying the interpolation operation to the second reference points defining the target second sub-space comprises:
using the second reference points defining the target second sub-space to perform the interpolation operation so as to obtain a plurality of first interpolated locations, wherein the first interpolated locations are located on the edges of the target second sub-space;
using the first interpolated locations to perform the interpolation operation so as to obtain a plurality of second interpolated locations; and
using the second interpolated locations to perform the interpolation operation so as to obtain a location of the mapped point.

6. The color translation method of claim 1, wherein the color axes at least comprise four of red (R), green (G), blue (B), yellow (Y), cyan (C), magenta (M), and gray (W) axes.

7. The color translation method of claim 1, wherein the first color space and the second color space are constructed on a red-green-blue (RGB) color model or a cyan-magenta-yellow (CMY) color model.

8. The color translation method of claim 1, wherein a quantity of the at least four color axes is seven.

9. The color translation method of claim 8, wherein the color axes comprise a red axis, a green axis, a blue axis, a yellow axis, a cyan axis, a magenta axis, and a gray axis.

10. The color translation method of claim 9, wherein the red axis, the green axis, the blue axis, the yellow axis, the cyan axis, the magenta axis, and the gray axis are used to divide the first color space into three quadrangular pyramids, and the quadrangular pyramids of the first color space are divided into the first sub-spaces according to the first reference points; and the red axis, the green axis, the blue axis, the yellow axis, the cyan axis, the magenta axis, and the gray axis are used to divide the second color space into three quadrangular pyramids, and the quadrangular pyramids of the second color space are divided into the second sub-spaces according to the second reference points corresponding to the first reference points.

11. The color translation method of claim 1, wherein a quantity of the at least four color axes is four.

12. The color translation method of claim 11, wherein the color axes comprise a red axis, a green axis, a blue axis, and a gray axis.

13. The color translation method of claim 12, wherein the red axis, the been axis, the blue axis, and the gray axis are used to divide the first color space into three quadrangular pyramids, and the quadrangular pyramids of the first color space are divided into the first sub-spaces according to the first reference points; and the red axis, the green axis, the blue axis, and the gray axis are used to divide the second color space into three quadrangular pyramids, and the quadrangular pyramids of the second color space are divided into the second sub-spaces according to the second reference points corresponding to the first reference points.

14. A color translation method adapted for a color translation apparatus to map a data point from a first color space to a second color space, the color translation apparatus comprising an operating unit and a memory coupled to the operating unit, the method comprising:
obtaining a plurality of first reference points in the first color space stored in the memory by the operating unit of the color translation apparatus, using seven color axes to divide the first color space into three quadrangular pyramids, and coordinating the seven color axes with the plurality of first reference points in the first color space to divide the quadrangular pyramids of the first color space into a plurality of first sub-spaces by the operating unit;
using seven color axes to divide the second color space into three quadrangular pyramids, and coordinating the seven color axes with a plurality of second reference points in the second color space corresponding to the first reference points to divide the quadrangular pyramids of the second color space into a plurality of second sub-spaces by the operating unit;
using a location of the data point on three of the seven color axes to determine which of the quadrangular pyramids of the first color space where the data point is located by the operating unit;
if the data point belongs to a target quadrangular pyramid of the plurality of quadrangular pyramids of the first color space, determining which of the first sub-spaces of the target quadrangular pyramid the data point belongs to by the operating unit;
if the data point belongs to a target first sub-space in the first sub-spaces, finding a target second sub-space corresponding to the target first sub-space and the second reference points defining the target second sub-space by using the first reference points defining the target first sub-space by the operating unit; and
according to a positional relationship between the data point and the first reference points defining the target first sub-space in the first color space, applying an interpolation operation the second reference points defining the target second sub-space by an interpolator of the operating unit, so as to obtain a mapped point of the data point in the second color space, and a location of the mapped point on the three color axes.

15. The color translation method of claim 14, wherein the seven color axes comprise a red axis, a green axis, a blue axis, a yellow axis, a cyan axis, a magenta axis, and a gray axis, and the three color axes are the red axis, the green axis, and the blue axis.

16. The color translation method of claim 14, wherein the target first sub-space is a first polyhedron, and a portion of the first reference points are located on a plurality of vertices of the first polyhedron, and
the target second sub-space is a second polyhedron, and a portion of the second reference points are located on a plurality of vertices of the second polyhedron.

17. The color translation method of claim 14, wherein each of the first sub-spaces is defined by a portion of the first reference points, and each of the second sub-spaces is defined by a portion of the second reference points.

18. The color translation method of claim 14, wherein the step of applying the interpolation operation to the second reference points defining the target second sub-space comprises:
using the second reference points defining the target second sub-space to perform the interpolation operation so as to obtain a plurality of first interpolated locations, wherein the first interpolated locations are located on the edges of the target second sub-space;

using the first interpolated locations to perform the interpolation operation so as to obtain a plurality of second interpolated locations; and using the second interpolated locations to perform the interpolation operation so as to obtain the location of the mapped point.

19. A color translation apparatus adapted to map a data point from a first color space to a second color space, the color translation apparatus comprising:

a memory storing a plurality of first reference points in the first color space and a plurality of second reference points in the second color space; and an operating unit coupled to the memory, wherein the operating unit uses at least four color axes coordinating with the plurality of first reference points in the first color space to divide the first color space into a plurality of first sub-spaces; the operating unit uses the at least four axes coordinating with the second reference points in the second color space corresponding to the first reference points to divide the second color space into a plurality of second sub-spaces; the operating unit finds a target first sub-space in the first color space where the data point is located in the first sub-spaces, and finds a target second sub-space in the second color space corresponding to the target first sub-space; and according to a positional relationship between the data point and the first reference points defining the target first sub-space in the first color space, the operating unit applies an interpolation operation to the second reference points defining the target second sub-space so as to obtain a mapped point of the data point in the second color space.

* * * * *